(12) United States Patent
Hoyle

(10) Patent No.: US 7,062,526 B1
(45) Date of Patent: Jun. 13, 2006

(54) MICROPROCESSOR WITH ROUNDING MULTIPLY INSTRUCTIONS

(75) Inventor: David Hoyle, Glendale, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 646 days.

(21) Appl. No.: 09/703,140

(22) Filed: Oct. 31, 2000

Related U.S. Application Data

(60) Provisional application No. 60/183,654, filed on Feb. 18, 2000, provisional application No. 60/183,527, filed on Feb. 18, 2000.

(51) Int. Cl.
*G06F 7/52* (2006.01)
*G06F 7/38* (2006.01)

(52) U.S. Cl. ..................... 708/620; 708/550

(58) Field of Classification Search ........... 708/620, 708/625, 550–551
See application file for complete search history.

(56) References Cited

U.S. PATENT DOCUMENTS

| | | | |
|---|---|---|---|
| 5,253,078 A * | 10/1993 | Balkanski et al. ......... 382/250 |
| 5,442,799 A * | 8/1995 | Murakami et al. ............ 712/36 |
| 5,586,070 A * | 12/1996 | Purcell ....................... 708/620 |
| 5,644,522 A | 7/1997 | Moyse et al. .......... 364/745.02 |
| 5,751,622 A * | 5/1998 | Purcell ....................... 708/625 |
| 6,014,684 A * | 1/2000 | Hoffman .................... 708/620 |
| 6,038,583 A * | 3/2000 | Oberman et al. .......... 708/628 |
| 6,167,419 A * | 12/2000 | Saishi et al. ............... 708/620 |
| 6,286,024 B1 * | 9/2001 | Yano et al. ................ 708/625 |
| 6,523,055 B1 * | 2/2003 | Yu et al. .................... 708/603 |

OTHER PUBLICATIONS

Chevillat et al. Pipelined Hardware Multiplier with Extended Precision, IBM Tech. Discl. Bull., vol. 23, No. 9, Feb. 1981, pp. 4322-4323.*

* cited by examiner

*Primary Examiner*—Tan V. Mai
(74) *Attorney, Agent, or Firm*—Robert D. Marshall, Jr.; W. James Brady; Frederick J. Telecky, Jr.

(57) ABSTRACT

A functional unit in a digital system is provided with a rounding Multiplication instruction, wherein a most significant product of first pair of elements is combined with a least significant product of a second pair of elements, the combined product is rounded, and the final result is stored in a destination. Rounding is performed by adding a rounding value to form an intermediate result, and then shifting the intermediate result right. A combined result is rounded to a fixed length shorter than the combined product.

17 Claims, 8 Drawing Sheets

FIG. 3A

OPERATIONS ON THE .L UNIT

| CREG | Z | DST | SCR2 | SRC1/CST | X | OP | 1 | 1 | 0 | S | P |
|---|---|---|---|---|---|---|---|---|---|---|---|
| 3 | | 5 | 5 | 5 | | 7 | | | | | |

Bits: 31 29 28 27 | 23 22 | 18 17 | 13 12 11 | 5 4 3 2 1 0

FIG. 3B

OPERATIONS ON THE .M UNIT

| CREG | Z | DST | SCR2 | SRC1/CST | X | OP | 0 | 0 | 0 | S | P |
|---|---|---|---|---|---|---|---|---|---|---|---|
| 3 | | 5 | 5 | 5 | | 5 | | | | | |

Bits: 31 29 28 27 | 23 22 | 18 17 | 13 12 11 | 7 6 5 4 3 2 1 0

FIG. 3C

OPERATIONS ON THE .D UNIT

| CREG | Z | DST | SCR2 | SRC1/CST | OP | 1 | 0 | 0 | 0 | S | P |
|---|---|---|---|---|---|---|---|---|---|---|---|
| 3 | | 5 | 5 | 5 | 6 | | | | | | |

Bits: 31 29 28 27 | 23 22 | 18 17 | 13 12 | 7 6 5 4 3 2 1 0

FIG. 3D

LOAD/STORE WITH 15-BIT OFFSET (ON THE .D UNIT)

| CREG | Z | DST/SRC | UCST15 | Y | LD/ST | 1 | 1 | S | P |
|---|---|---|---|---|---|---|---|---|---|
| 3 | | 5 | 15 | | 3 | | | | |

Bits: 31 29 28 27 | 23 22 | 8 7 6 4 3 2 1 0

FIG. 3E

LOAD/STORE 'BASER' + 'OFFSETR/CST' ON THE .D UNIT

| CREG | Z | DST/SRC | BASE R | OFFSET R/UCST5 | MODE | R | Y | LD/ST | 0 | 1 | S | P |
|---|---|---|---|---|---|---|---|---|---|---|---|---|
| 3 | | 5 | 5 | 5 | 4 | | | 3 | | | | |

Bits: 31 29 28 27 | 23 22 | 18 17 | 13 12 | 9 8 7 6 4 3 2 1 0

OPERATIONS ON THE .S UNIT

| 31 | 29 28 | 27 23 | 22 18 | 17 13 | 12 11 | 10 6 | 5 4 3 2 | 1 | 0 |
|---|---|---|---|---|---|---|---|---|---|
| CREG | Z | DST | SRC2 | SRC1/CST | X | OP | 0 0 0 0 | S | P |
| 3 | | 5 | 5 | 5 | | 6 | | | |

FIG. 3F

ADDK ON THE .S UNIT

| 31 | 29 28 | 27 23 | 22 7 | 6 5 4 3 2 | 1 | 0 |
|---|---|---|---|---|---|---|
| CREG | Z | DST | CST | 1 0 0 0 | S | P |
| 3 | | 5 | 16 | | | |

FIG. 3G

BITFIELD OPERATIONS (IMMEDIATE FORMS) ON THE .S UNIT

| 31 | 29 28 | 27 23 | 22 18 | 17 13 | 12 8 | 7 6 | 5 4 3 2 | 1 | 0 |
|---|---|---|---|---|---|---|---|---|---|
| CREG | Z | DST | SRC2 | CSTA | CSTB | OP | 0 0 1 0 | S | P |
| 3 | | 5 | 5 | 5 | 5 | 2 | | | |

FIG. 3H

MVK AND MVKH ON THE .S UNIT

| 31 | 29 28 | 27 23 | 22 7 | 6 | 5 4 3 2 | 1 | 0 |
|---|---|---|---|---|---|---|---|
| CREG | Z | DST | CST | H | 0 1 0 0 | S | P |
| 3 | | 5 | 16 | | | | |

FIG. 3I

BCOND DISP ON THE .S UNIT

| 31 | 29 28 | 27 7 | 6 5 4 3 2 | 1 | 0 |
|---|---|---|---|---|---|
| CREG | Z | CST | 0 0 1 0 0 | S | P |
| 3 | | 21 | | | |

FIG. 3J

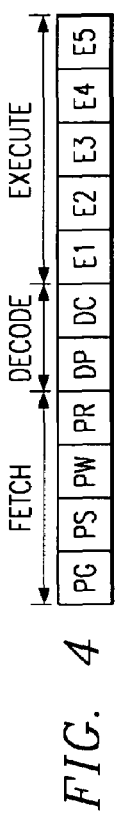
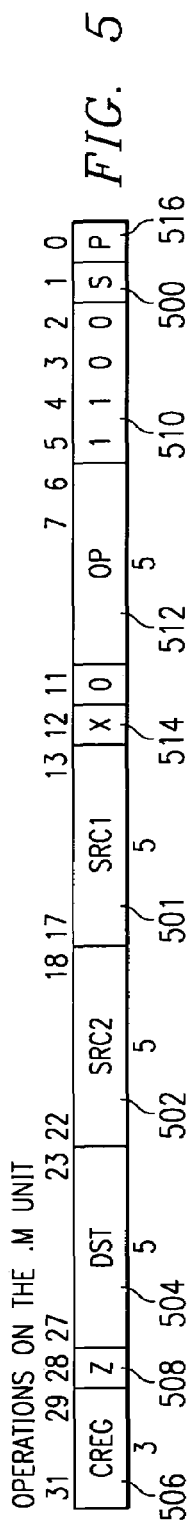
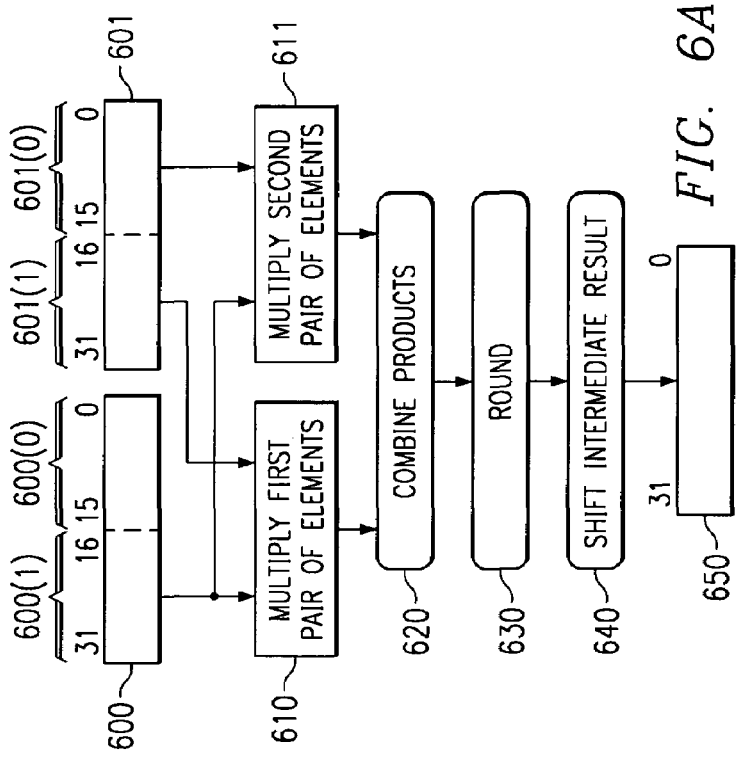

MICROPROCESSOR WITH ROUNDING MULTIPLY INSTRUCTIONS

This application claims priority under 35 USC §119(e)(1) of Provisional Application No. 60/183,527, filed Feb. 18, 2000 and of Provisional Application No. 60/183,654, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor, and a method for operating a microprocessor that improves digital signal processing performance. Aspects of the invention are specified in the claims.

In an embodiment of the present invention, a digital signal processor is provided which has an instruction for forming a 16×32-bit product that is rounded and then truncated to form a 32-bit result.

In an embodiment of the invention, a 32-bit operand is treated as two 16-bit fields. In another embodiment, an operand size different from 32-bits may be operated on, and the field sizes may be different than 16 bits.

In an embodiment of the invention, one instruction is provided which selects a high half word from two packed fields, and another instruction is provided that selects a low half word from two packed fields. In another embodiment, the number of fields may be different than two. In another embodiment, a control register or parameter selects the field.

BRIEF DESCRIPTION OF THE DRAWINGS

Other features and advantages of the present invention will become apparent by reference to the following detailed description when considered in conjunction with the accompanying drawings, in which:

FIGS. 3A–3J show an opcode map for the DSP of FIG. 1;

FIG. 4 is a timing diagram illustrating instruction execution pipeline phase of the processor of FIG. 1;

FIG. 5 illustrates an instruction syntax for a Multiply 16 lsb×32-bit, shift and round (MPYLIR) instruction and a Multiply 16 msb×32-bit, shift and round (MPYHIR) instruction;

FIG. 6A is a flow chart illustrating operation of the MPYHIR instruction;

DETAILED DESCRIPTION OF EMBODIMENTS OF THE INVENTION

Figure 1:
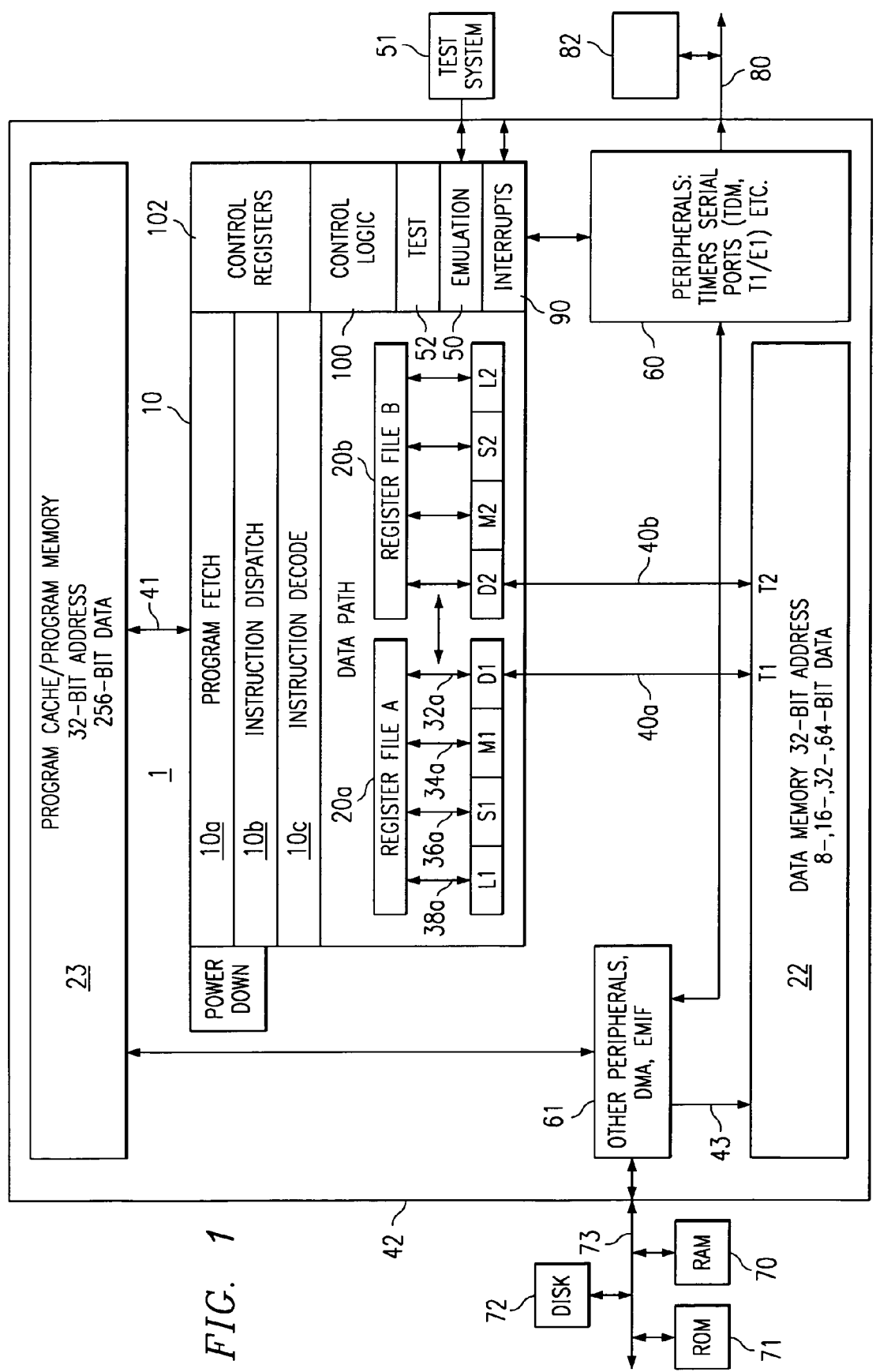
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to to load/store unit D1 over a first set of busses 32a, to multiplier M1 over a second set of busses 34a, to ALU/shifter unit S1 over a third set of busses 36a and to ALU L1 over a fourth set of busses 38a Data are provided to/from the memory 22 from/to the load/store unit D1 via a fifth set of busses 40a. Note that the entire data path described above is duplicated with register file 20b and execution units D2, M2, S2, and L2. Load/store unit D2 similarly interfaces with memory 22 via a set of busses 40b. In this embodiment of the present invention, two unrelated aligned double word (64 bits) load/store transfers can be made in parallel between CPU 10 and data memory 22 on each clock cycle using bus set 40a and bus set 40b.

A single non-aligned double word load/store transfer is performed by scheduling a first .D unit resource and two load/store ports on memory 22. Advantageously, an extraction circuit is connected to the memory subsystem to provide a non-aligned data item extracted from two aligned data items requested by the .D unit. Advantageously, a second .D unit can perform 32-bit logical or arithmetic instructions in addition to the .S and .L units while the address port of the second .D unit is being used to transmit one of two contiguous addresses provided by the first .D unit. Furthermore, a non-aligned access near the end of a circular buffer region in the target memory provides a non-aligned data item that wraps around to the other end of the circular buffer.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331, which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller part of functional block 61 connects to data memory 22 via bus 43 and is generally used to move data between memory and peripherals within microprocessor 1 and memory and peripherals which are external to microprocessor 1.

In the present embodiment, CPU core 10 is encapsulated as a MegaModule, however, other embodiments of the present invention may be in custom designed CPU's or mass market microprocessors, for example.

A detailed description of various architectural features of the microprocessor of FIG. 1 is provided in coassigned application U.S. Pat. No. 6,182,203 and is incorporated herein by reference. A description of enhanced architectural features and an extended instruction set not described herein for CPU 10 is provided in coassigned U.S. patent application Ser. No. 09/703,096 Microprocessor with Improved Instruction Set Architecture and is incorporated herein by reference.

Figure 2:
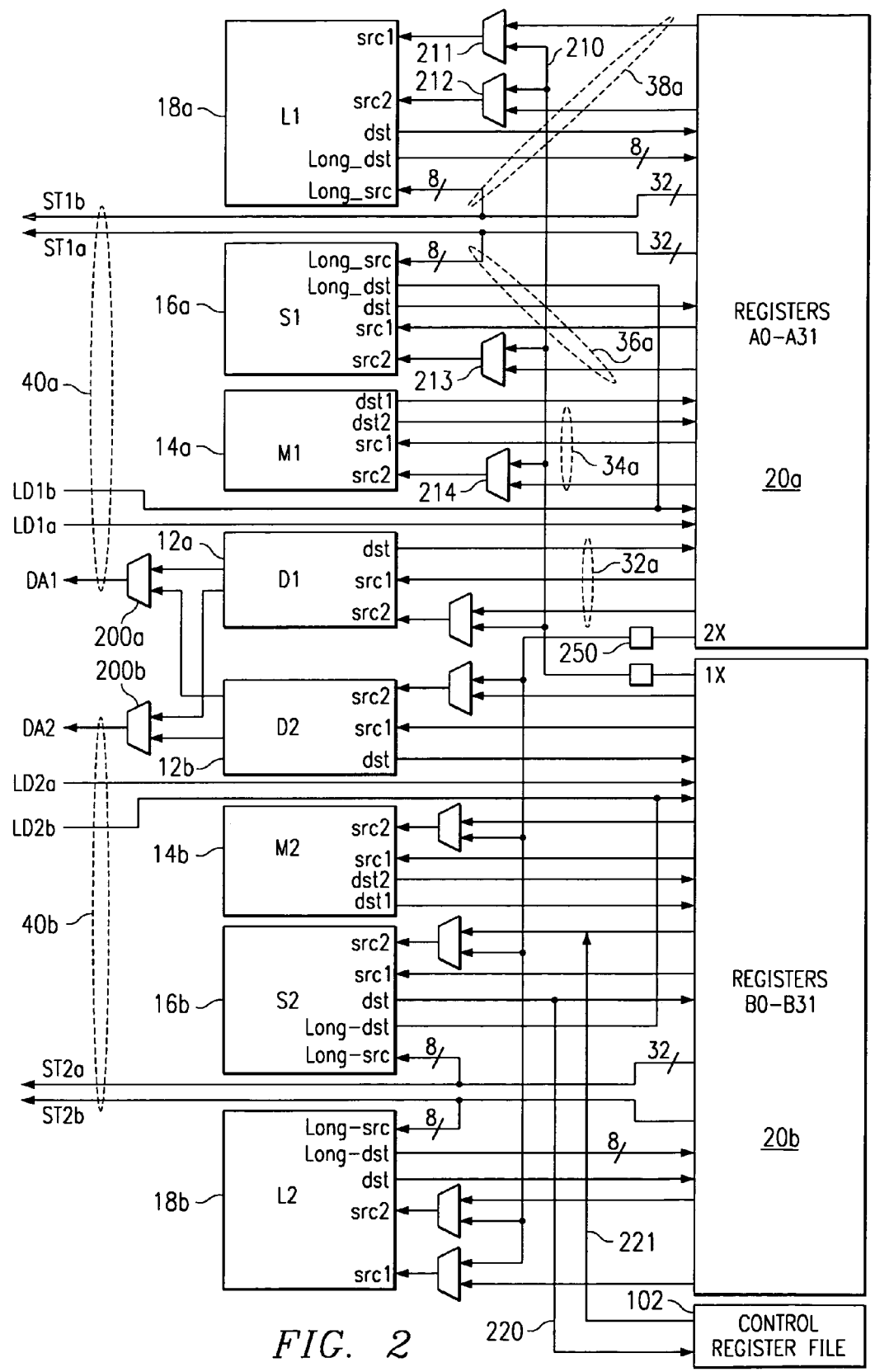
FIG. 2 is a block diagram of the functional units, data paths and register files of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for register file A 20*a* and B0–B31 for register file B 20*b*). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is encoded in the instruction opcode.

TABLE 1

40-Bit/64-Bit Register Pairs
Register Files

| A | B |
|---|---|
| A1:A0 | B1:B0 |
| A3:A2 | B3:B2 |
| A5:A4 | B5:B4 |
| A7:A6 | B7:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

For 40-bit data, operations requiring a long input ignore the 24 MSBs of the odd register. Operations producing a long result zero-fill the 24 MSBs of the odd register. The even register is encoded in the opcode.

The eight functional units in processor 10's data paths are be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on a .M unit. The ADD4 instruction performs four 8-bit additions with a single instruction on a .L unit.

TABLE 2

Functional Units and Operations Performed

| Functional Unit | Fixed-Point Operations |
|---|---|
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, .S2) | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 x 16 multiply operations |
| | 16 x 32 multiply operations |
| | Bit expansion |
| | Bit interleaving/de-interleaving |
| | Quad 8 x 5 multiply operations |
| | Paired 16 x 16 multiply operations |
| | Paired 16 x 16 multiply with add/subtract operations |
| | Quad 8 x 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file (Refer to FIG. 2). All units ending in 1 (for example, .L1) write to register file A 20*a* and all units ending in 2 write to register file B 20*b*. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32-bit operations all eight units can be used in parallel every cycle. Since each multiplier can return up to a 64-bit result, two write ports (dst1 and dst2) are provided from the multipliers to the respective register file.

Register File Cross Paths

Each functional unit reads directly from and writes directly to the register file within its own data path. That is, the .L1 unit 18*a*, .S1 unit 16*a*, .D1 unit 12*a* and .M1 unit 14*a* write to register file A 20*a* and the .L2 unit 18*b*, .S2 unit 16*b*, .D2 unit 12*b*, and .M2 unit 14*b* write to register file B 20*b*. The register files are connected to the opposite-side register file's functional units via the 1× and 2× cross paths. These cross paths allow functional units from one data path to access a 32-bit operand from the opposite side's register file. The 1× cross path allows data path A's functional units to read their source from register file B. Similarly, the 2× cross path allows data path B's functional units to read their source from register file A.

All eight of the functional units have access to the opposite sides register file via a cross path The .M1, .M2, .S1, .S2, .D1, and .D2 units' src2 inputs are selectable between the cross path and the same side register file. In the case of the .L1 and .L2 both src1 and src2 inputs are also selectable between the cross path and the same-side register file. Cross path 1× bus 210 couples one input of multiplexer 211 for src1 input of .L1 unit 16*a* and multiplexer 212 for src2 input of .L1 unit 18*a*, multiplexer 213 for src2 input of .S1 unit 16*a* and multiplexer 214 for src2 input of .M1 unit 14*a*. Multiplexers 211, 212, 213, and 214 select between the cross path 1× bus 210 and an output of register file A 20*a*. Buffer 250 buffers cross path 2× output to similar multiplexers for .L2, .S2, .M2, and .D2 units.

Only two cross paths, 1× and 2×, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, only one functional unit per data path, per execute packet could get an operand from the opposite register file.

A delay clock cycle is introduced whenever an instruction attempts to read a register via a cross path that was updated in the previous cycle. This is known as a cross path stall. This stall is inserted automatically by the hardware; no NOP instruction is needed. It should be noted that no stall is introduced if the register being read is the destination for data loaded by a LDx instruction.

S2 unit 16*b* may write to control register file 102 from its dst output via bus 220. S2 unit 16*b* may read from control register file 102 to its src2 input via bus 221.

Memory, Load and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40*a* has an address bus DA1 which is driven by mux 200*a*. This allows an address generated by either load/store unit D1 or D2 to provide a memory address for loads or stores for register file 20*a*. Data Bus LD1 loads data from an address in memory 22 specified by address bus DA1 to a register in load unit D1. Unit D1 may manipulate the data provided prior to storing it in register file 20*a*. Likewise, data bus ST1 stores data from register file 20*a* to memory 22. Load/store unit D1 performs the following operations: 32-bit add, subtract, linear and circular address calculations. Load/store unit D2 operates similarly to unit D1 via bus 40*b*, with the assistance of mux 200*b* for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations appear in functional unit fields for load and store instructions.

For example, the following load instruction uses the D1 unit to generate the address but is using the LD2a path resource from DA2 to place the data in the B register file. The use of the DA2 resource is indicated with the T2 designation, for example: LDW .D1T2 *A0[3], B1.

Table 3 defines the mapping between instructions and functional units for a set of basic instructions included in a DSP described in U.S. Pat. No. 6,182,203 incorporated herein by reference), Table 4 defines a mapping between instructions and functional units for a set of extended instructions in an embodiment of the present invention. Alternative embodiments of the present invention may have different sets of instructions and functional unit mapping. Table 3 and Table 4 are illustrative and are not exhaustive or intended to limit various embodiments of the present invention.

TABLE 3

Instruction to Functional Unit Mapping of Basic Instructions

| .L Unit | .M Unit | .S Unit | .D Unit |
|---------|---------|---------|---------|
| ABS     | MPY     | ADD     | ADD     |
| ADD     | SMPY    | ADDK    | ADDA    |
| AND     |         | ADD2    | LD mem  |
| CMPEQ   |         | AND     | LD mem (15-bit offset) (D2 only) |
| CMPGT   |         | B disp  | MV      |
| CMPGTU  |         | B IRP   | NEG     |
| CMPLT   |         | B NRP   | ST mem  |
| CMPLTU  |         | B reg   | ST mem (15-bit offset) (D2 only) |
| LMBD    |         | CLR     | SUB     |
| MV      |         | EXT     | SUBA    |
| NEG     |         | EXTU    | ZERO    |
| NORM    |         | MVC     |         |
| NOT     |         | MV      |         |
| OR      |         | MVK     |         |
| SADD    |         | MVKH    |         |
| SAT     |         | NEG     |         |
| SSUB    |         | NOT     |         |
| SUB     |         | OR      |         |
| SUBC    |         | SET     |         |
| XOR     |         | SHL     |         |
| ZERO    |         | SHR     |         |
|         |         | SHRU    |         |
|         |         | SSHL    |         |
|         |         | STP (S2 only) |   |
|         |         | SUB     |         |
|         |         | SUB2    |         |
|         |         | XOR     |         |
|         |         | ZERO    |         |

TABLE 4

Instruction to Functional Unit Mapping of Extended Instructions

| .L unit | .M unit | .S unit | .D unit |
|---------|---------|---------|---------|
| ABS2    | AVG2    | ADD2    | ADD2    |
| ADD2    | AVGU4   | ADDKPC  | AND     |
| ADD4    | BITC4   | AND     | ANDN    |
| AND     | BITR    | ANDN    | LDDW    |
| ANDN    | DEAL    | BDEC    | LDNDW   |

TABLE 4-continued

Instruction to Functional Unit Mapping of Extended Instructions

| .L unit | .M unit | .S unit | .D unit |
|---------|---------|---------|---------|
| MAX2 | DOTP2 | BNOP | LDNW |
| MAXU4 | DOTPN2 | BPOS | MVK |
| MIN2 | DOTPNRSU2 | CMPEQ2 | OR |
| MINU4 | DOTPNRUS2 | CMPEQ4 | STDW |
|  | DOTPRSU2 | CMPGT2 |  |
|  | DOTPRUS2 | CMPGTU4 |  |
| MVK | DOTPSU4 | CMPLT2 | STNDW |
|  | DOTPUS4 |  |  |
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 |  |
| PACKHL2 | MPYHIR | PACKH2 |  |
|  | MPYIH |  |  |
|  | MPYIHR |  |  |
| PACKL4 | MPYIL | PACKHL2 |  |
|  | MPYILR |  |  |
|  | MPYLI |  |  |
| PACKLH2 | MPYLIR | PACKLH2 |  |
| SHLMB | MPYSU4 | SADD2 |  |
|  | MPYUS4 |  |  |
| SHRMB | MPYU4 | SADDU4 |  |
| SUB2 | MVD | SADDSU2 |  |
|  |  | SADDUS2 |  |
| SUB4 | ROTL | SHLMB |  |
| SUBABS4 | SHFL | SHR2 |  |
| SWAP2 | SMPY2 | SHRMB |  |
| SWAP4 | SSHVL | SHRU2 |  |
| UNPKHU4 | SSHVR | SPACK2 |  |
| UNPKLU4 | XPND2 | SPACKU4 |  |
| XOR | XPND4 | SUB2 |  |
|  |  | SWAP2 |  |
|  |  | UNPKHU4 |  |
|  |  | UNPKLU4 |  |
|  |  | XOR |  |

The DSP's opcode map is shown in FIGS. 3A–3J. Refer to the instruction descriptions later herein for explanations of the field syntax and values. An instruction syntax is used to describe each instruction. The opcode map breaks down the various bit fields that make up each instruction. There are certain instructions that can be executed on more than one functional unit, as was shown in Table 4. The syntax specifies the functional unit and various resources used by an instruction, typically as follows:

EXAMPLE (.unit) src, dst

The following are examples of what the syntax looks like for the ADD instruction:
1) ADD (.unit) src1, src2, dst
2) ADDU (.unit) src1, src2, dst
3) ADD (.unit) src2, src1, dst
   unit=.L1, .L2, .S1, .S2, .D1, .D2 src and dst indicate source and destination respectively. The (.unit) dictates which functional unit the instruction is mapped to (.L1, .L2, .S1, .S2, .M1, .M2, .D1, or .D2). This instruction has three opcode map fields: src1, src2, and dst.

The addressing modes for instructions that access memory are linear, circular using BK0, and circular using BK1. The mode is specified by an addressing mode register (AMR) contained in control register file 102. Eight registers can perform circular addressing. A4–A7 are used by the .D1 unit and B4–B7 are used by the .D2 unit. No other units can perform circular addressing modes. For each of these registers, the AMR specifies the addressing mode.

All instructions can be conditional. The condition is controlled by a 3-bit (creg) field specifying a register to be tested, and a 1-bit field (z) specifying a test for zero or nonzero, as shown in FIGS. 3A–3J. The four MSBs of every opcode are creg and z. The specified register is tested at the beginning of the E1 instruction execution pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. The creg register field is encoded as shown in Table 5. Conditional instructions are represented by "[ ]" surrounding the condition register.

TABLE 5

Registers That Can Be Tested by Conditional Operations

| Creg | | | z | Register Tested |
|------|---|---|---|-----------------|
| 31 | 30 | 29 | 28 |  |
| 0 | 0 | 0 | 0 | Unconditional. |
| 0 | 0 | 0 | 1 | Reserved: When selected this indicates a SWBP instruction |
| 0 | 0 | 1 | z | B0 |
| 0 | 1 | 0 | z | B1 |
| 0 | 1 | 1 | z | B2 |
| 1 | 0 | 0 | z |  |
| 1 | 0 | 0 | z | A1 |
| 1 | 0 | 1 | z | A2 |
| 1 | 1 | x | x | Reserved |

Note: x is don't care for reserved cases.

Instructions are always fetched eight at a time. This constitutes a fetch packet. The execution grouping of the fetch packet is specified by the p-bit, bit zero, of each instruction. Fetch packets are 8-word aligned.

The p bit controls the parallel execution of instructions. The p bits are scanned from left to right (lower to higher address). If the p bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet can contain up to eight instructions. All instructions in an execute packet must use a unique functional unit.

Pipeline Operation

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited by stalls from the memory system, stalls for cross path dependencies, or interrupts. The reasons for memory stalls are determined by the memory architecture. Cross path stalls are described in detail in U.S. patent Ser. No. 09/702,453, to Steiss, et al and is incorporated herein by reference. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, stalls can cause CPU cycles to extend over multiple clock cycles. To understand the machine state at CPU cycle boundaries, one must be concerned only with the execution phases (E1–E5) of the pipeline. The phases of the pipeline are shown in FIG. 4 and described in Table 6.

memory subsystem 22. Other of the functional units do not embody all five execution phase, but only what is required for the instruction types that are executed by a particular functional unit.

The execution of instructions can be defined in terms of delay slots, as shown in Table 7. A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

TABLE 7

Delay Slot Summary

| Instruction Type | Delay Slots | Execute Stages Used |
|---|---|---|
| Branch (The cycle when the target enters E1) | 5 | E1–branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |

TABLE 6

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Referring again to FIG. 4 and FIG. 1, the instruction execution pipeline of processor 10 involves a number of discrete stages, generally demarcated by temporary latches or registers to pass the results of one stage to the next. Instruction pipeline phases PG, PS, PW, and PR all involve instruction fetching and are embodied in program fetch circuit 10 in association with program memory subsystem 23. Pipeline phases DP and DC involve instruction decoding; phase DP is embodied in dispatch circuitry 10b, while pipeline phase DC is embodied in decode circuitry 10c. The execution phases E1–E5 are embodied in stages embodied within each functional unit L, S, M and D. For example, the D units embody all five execute stage in association with TABLE 7-continued Delay Slot Summary

| Instruction Type | Delay Slots | Execute Stages Used |
|---|---|---|
| Store | 0 | E1 |
| NOP (no execution pipeline operation) | — | — |
| STP (no CPU internal results written) | — | — |

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

1) When a load is executed before a store, the old value is loaded and the new value is stored.

2) When a store is executed before a load, the new value is stored and the new value is loaded.

3) When the instructions are in are in parallel, the old value is loaded and the new value is stored.

Multiply 16 lsb×32-bit, shift and round (MPYLIR), Multiply 16 msb×32-bit, shift and round (MPYHIR) Instructions An aspect of the present embodiment is that the DSP of FIG. 1 includes an extensive set of packed data instructions that provide features of single instruction, multiple data (SIMD) operation. By so doing, performance of the processor is improved. Other instructions are provided to operate on packed fields. One such instruction is a Multiply 16 lsb×32-bit, shift and round (MPYLIR) instruction. Another instruction included in the present embodiment is a Multiply 16 msb×32-bit, shift and round (MPYHIR) instruction.

FIG. 5 illustrates an instruction syntax for an MPYLIR instruction. This same syntax is used for an MPYHIR. In this embodiment, an MPY(H/L)IR instruction can be executed in either .M functional unit 14a or 14b as indicated by unit select bit field 500. The instruction includes a first source operand field (src1) 501 and a second source operand field (src2) 502 that each select a register from associated register file 20a or 20b to access a source operand which is a 32-bit data value. The MPYHIR instruction performs a 16-bit by 32-bit multiply. The upper half of src1 is used as a 16-bit signed input. The value in src2 is treated as a 32-bit signed value. The product is then rounded to a 32-bit result by adding the value $2^{14}$ and then this sum is right shifted by 15. The lower 32-bits of the result are written into a destination register specified by a destination field (dst) 504.

Likewise, the MPYLIR instruction performs a 16-bit by 32-bit multiply. The lower half of src1 is used as a 16-bit signed input. The value in src2 is treated as a 32-bit signed value. The product is then rounded to a 32-bit result by adding the value $2^{14}$ and then this sum right shifted by 15. The lower 32-bits of the result are written into dst.

A complementary instruction, a MPYIHR pseudo-operation performs a 16-bit by 32-bit multiply. The upper half of src1 is used as a 16-bit signed input. The value in src2 is treated as a 32-bit signed value. The product is then rounded to a 32-bit result by adding the value $2^{14}$ and then this sum is right shifted by 15. The lower 32-bits of the result are written into dst. An assembler uses a MPYHIR src1, src2, dst to perform this operation.

Another complimentary instruction, a MPYILR pseudo-operation performs a 16-bit by 32-bit multiply. The lower half of src1 is used as a 16-bit signed input. The value in src2 is treated as a 32-bit signed value. The product is then rounded to a 32-bit result by adding the value $2^{14}$ and then this sum right shifted by 15. The lower 32-bits of the result are written into dst. The assembler uses a MPYLIR src1, src2, dst instruction to perform this operation.

Referring still to FIG. 5, field 510 defines a class of instruction formats, while opcode field 512 specifies that a particular instruction of this class is an MPYLIR or MPYHIR instruction. Crossover control field 514 specifies which register file 20a or 20b will be accessed for a source operand, as discussed previously. Parallel bit 516 indicates if this instruction is to be executed in parallel with an adjacent instruction in a fetch packet, as discussed previously.

As with all of the instructions executed by the DSP of FIG. 1, the MPYLIR/L instructions are conditional based on a predicate register selected by condition register field (creg) 506 and zero indicator bit 508, as discussed previously.

Table 8 defines the operation of the MPYHIR instruction, while Table 9 defines the operation of the MPYLIR instruction using pseudo code. Just as with other conditionally executed instructions, if the predicate condition tests false, MPY(H/L)IR instruction does not complete execution and the write of the dst register is inhibited.

TABLE 8

Execution of MPYHIR Instruction if(cond) {
  lsb32(((msb16(src1) × (src2)) + 0x4000) >> 15) → dst
}
else nop

TABLE 9

Execution of MPYLIR Instruction if(cond) {
  lsb32(((lsb16(src1) × (src2)) + 0x4000) >> 15) → dst
}
else nop FIG. 6A is a flow chart illustrating operation of the MPYHIR instructions. The MPYHIR instruction performs a multiply operation on packed 16-bit data from a first selected source operand (src1) 600 and a 32-bit data value contained in a second selected source operand (src2) 601. A data value in source operand 600 is treated as packed, signed 16-bit data, located in two distinct fields 600(0), 600(1). The product is then rounded and then right-shifted by 15 to produce a 32-bit result that is written to a selected destination register 650. The intermediate results are kept at full precision internally, so that no overflow conditions exist.

In step 610, a first pair of elements are multiplied together to form a first product. The most significant 16-bit value 600(1) of the first source operand and the most significant 16-bit value 601(1) of the second source operand are multiplied together to form a 32-bit first product. In step 611, a second pair of elements are multiplied together to form a second product. The most significant 16-bit value 600(1) of the first source operand and the least significant 16-bit value 601(0) of the second source operand are multiplied together to form a 32-bit second product. The two products are formed simultaneously by a pair of multiplier circuits in the M1 functional unit during the E1 execute phase.

In step 620, the first product is combined with the second product to form a 47-bit combined product. During this step, the first product is first shifted left by 16 bits since it corresponds to the most significant portion of src2. Both products are treated as signed values.

In step 630, the combined product is rounded by adding a rounding value to form an intermediate value. A rounding value of 0x4000 ($2^{14}$) is added to the combined product to form the intermediate value. This has the effect of rounding the signed 47-bit combined product at bit position 15. The intermediate value is treated as a signed integer value.

In step 640, the intermediate result is right shifted by fifteen bits and sign extended to form a 32-bit final result. Thus, the shifting truncates a selected number of least significant bits of the intermediate result such that the final result is shorter than the combined product, although it is sign extended to 32-bits for storage in a 32 bit register. The final result is then written to a register 650 in register file A specified by a "dst" field in the multiplication instruction during an E4 execution phase of the instruction execution pipeline of the processor, resulting in three delay slots for execution of this instruction.

In this embodiment, rounding at bit 15 of the 47-bit combined product with a rounding value of 0x4000 ($2^{14}$) and right shifting fifteen bits is performed in order to reduce processing time required for applications such as a high precision fast Fourier Transform, (FFT). The inventor of the present invention discovered that source code written for applications such as FFT in the known C programming language often contains a sequence of instructions which formed two 16×32-bit products which are added together as 48 bit quantities to maintain precision and then right shifted to form a 32-bit result. Advantageously, by using the rounding multiply instructions of the present invention, the prior sequence above can be directly replaced with a sequence of MPYHIR, MPYLIR, and ADD (32-bit) to reduce instruction count and improve processing performance. There is a difference of one-half bit at the most between results obtained by both sequences.

Figure 6B:
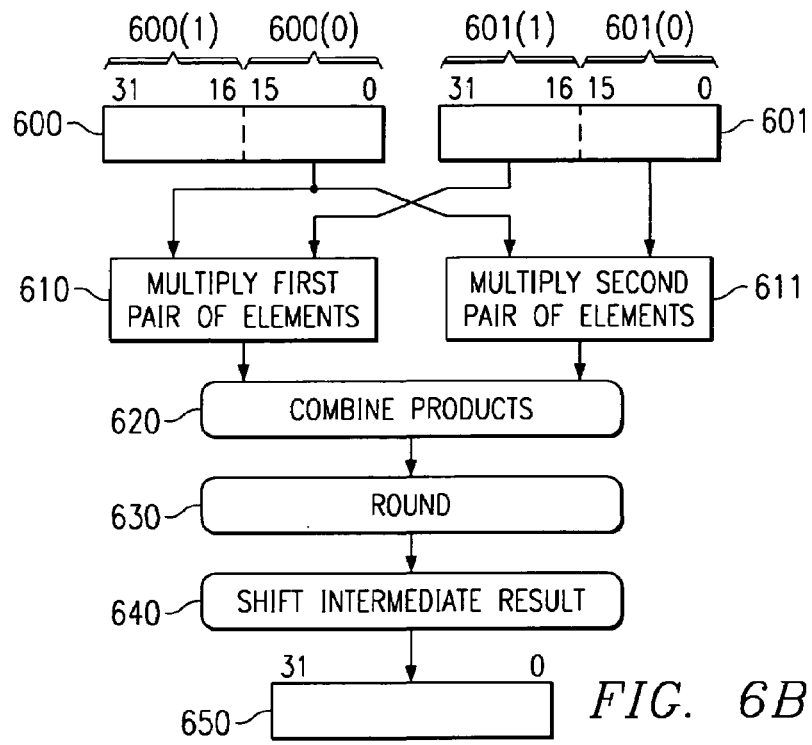
FIG. 6B is a flow chart illustrating operation of the MPYLIR instruction.
Figure 6C:
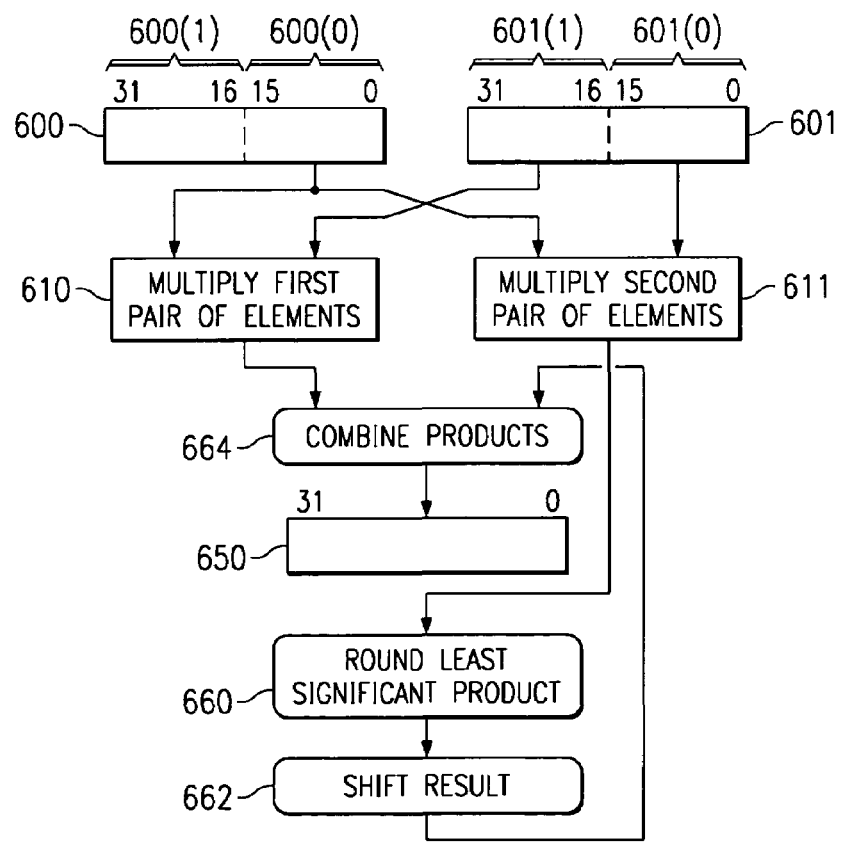
FIG. 6C is a flow chart illustrating an alternative embodiment of the operation of the MPYLIR instruction.

FIG. 6C is a flow chart illustrating an alternative embodiment of the operation of the MPYLIR instruction. In another embodiment, the least significant product from step 611 is rounded by adding 0x4000 in step 660 and then shifting right by 15 bits in step 662 to form a truncated least significant product. In step 664, the most significant product from step 610 is shifted left by just one bit, the then the most significant product and the truncated least significant product, such as: ((a_hi*b_ho)<<1)+((a_hi*b_lo+0x4000)>>15)).

FIG. 6B is a flow chart illustrating operation of the MPYLIR instruction. The MPYHIR instruction performs a multiply operation on packed 16-bit data from a first selected source operand (src1) 600 and a 32-bit data value contained in a second selected source operand (src2) 601. A data value in source operand 600 is treated as packed, signed 16-bit data, located in two distinct fields 600(0), 600(1). The product is then rounded and then right-shifted by 15 to produce a 32-bit result. The intermediate results are kept at full precision internally, so that no overflow conditions exist.

In step 610, a first pair of elements are multiplied together to form a first product. The least significant 16-bit value 600(0) of the first source operand and the most significant 16-bit value 601(1) of the second source operand are multiplied together to form a 32-bit first product. In step 611, a second pair of elements are multiplied together to form a second product. The least significant 16-bit value 600(1) of the first source operand and the least significant 16-bit value 601(0) of the second source operand are multiplied together to form a 32-bit second product. The two products are formed simultaneously by a pair of multiplier circuits in the M1 functional unit during the E1 execute phase.

The remaining steps 620, 630 and 640 are identical to FIG. 6A.

Figure 7A:
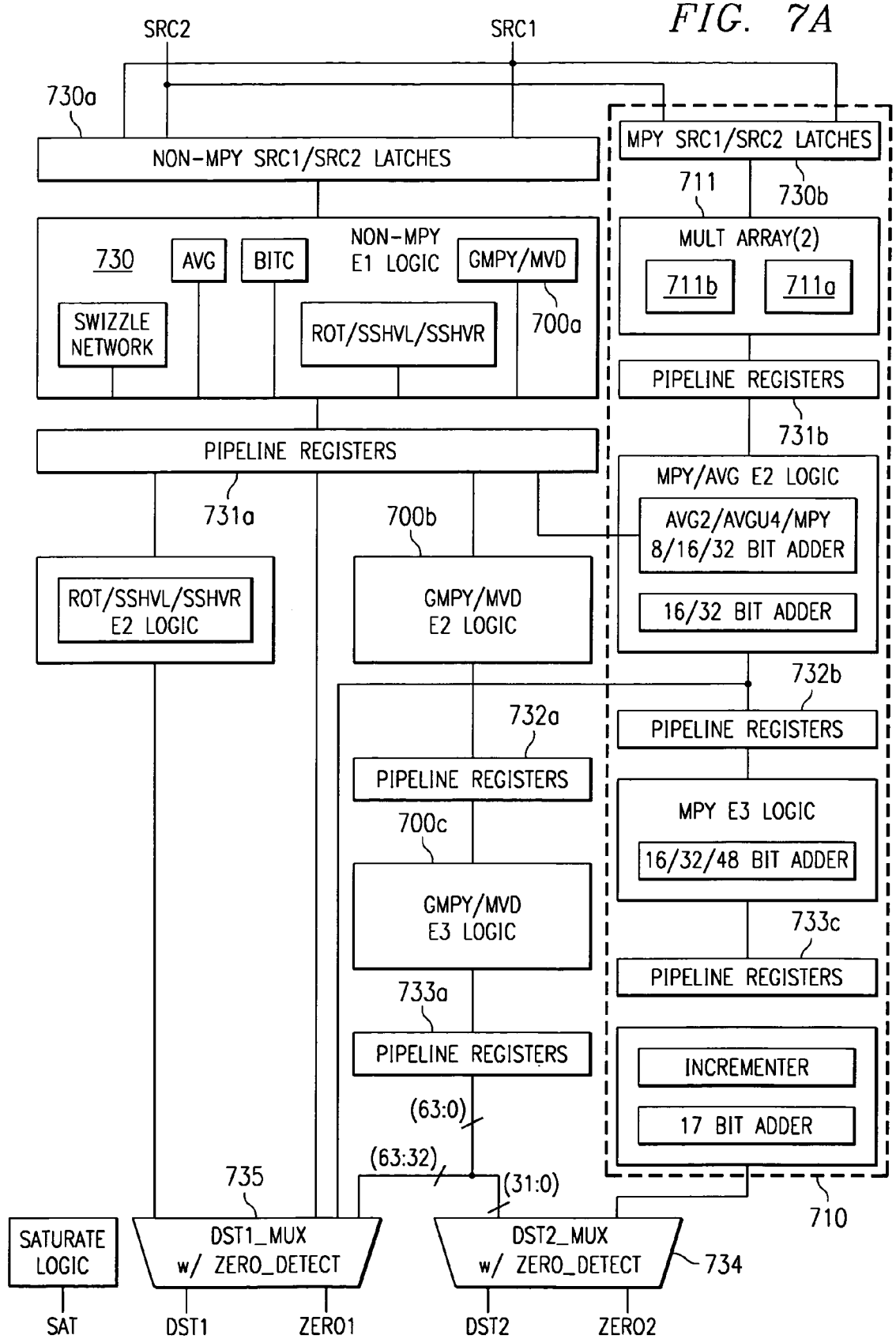
FIG. 7A is a block diagram illustrating a multiply circuit for performing MPY(H/L)IR instructions within an .M functional unit.

FIG. 7A is a top level block diagram of .M unit 14a, which is optimized to handle multiplication, although hardware is available for a limited set of non-multiply operations. In this embodiment, multiplier units M1, M2 are each similar and will be described in more detail with reference to FIGS. 7B–7D. A rounding multiply instruction MPY(H/L)IR can be executed on either one of the multiply units M1, M2 during any execution cycle of the instruction execution pipeline, unless a resource conflict limits inclusion of a rounding multiply instruction within a given execution packet.

The .M unit has three major functional units: Galois multiply unit 700a–c, multiply unit 710 and other non-multiply functional circuitry in block 720. Galois multiplier 700a–c and multiplier 710 require three additional cycles to complete the multiply operations, so multiply instructions are categorized as having three delay slots. Pipeline registers 730–733 hold partial results between each pipeline execution phase. In general, multiply unit 710 can perform the following operations on a pair of multipliers 711a,b: two 16×16 multiplies or four 8×8 multiplies with all combination of signed or unsigned numbers, Q-shifting and P-shifting of multiply results, rounding for multiply instructions, controlling the carry chain by breaking/joining the carry chain at 16-bit block boundaries, and saturation multiplication where the final result is shifted left by 1 or returns 0x7FFFFFFF if an overflow occurs. Galois multiply unit 700 performs Galois multiply in parallel with M multiply unit 710. The lower 32 bits (bits 31:0) of a result are selected by multiplexer 734 and are stored in the even register of a register pair. The upper 32 bits (bits 63:33) of the result are selected by multiplexer 735 and are stored in the odd register of the register pair. A more detailed description of configurable multiply circuitry is provided in coassigned U.S. Patent application Ser. No. 09/703,093 entitled Data Processor With Flexible Multiply Unit and is incorporated herein by reference. Details of the Galois multiply unit are provided in co-assigned U.S. patent application Ser. No. 09/507,187 to David Hoyle entitled Galois Field Multiply and is incorporated herein by reference.

Advantageously, in this embodiment, two rounding multiply instructions can be simultaneously executed during the same execution cycles on both M1 and M2, subject to resource constraints. Other embodiments of the invention may provide different compliments of multiply units, such as only one multiply unit, or three or more, for example. Therefore, in the following description of the rounding multiply instruction it is to be understood that even though the operation will be described with reference to the M1 functional unit, operation on the M2 functional unit is similar.

Figure 7B:
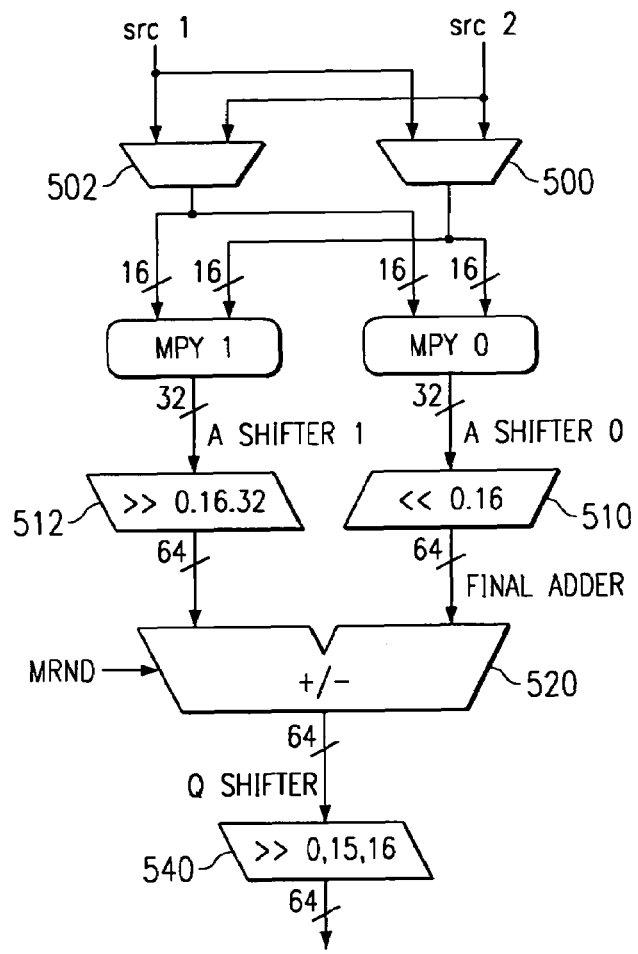
FIG. 7B is a block diagram of a pair of multipliers in an M unit of the DSP of FIG. 1.

FIG. 7B is a block diagram of an the paired multipliers that can be used in a digital system to embody the present invention. The M unit includes a pair of 16 by 16 multipliers mpy0, mpy1 and auxiliary hardware to enable a large number of multiply functions. The M unit receives two register inputs (src1 and src2) and generates a 64 bit output to an even/odd pair of registers. Each multiplier receives two 16 bit inputs. These may be independently selected as the upper/lower 16 bits of the 32 bit data word recalled from the src1 and src2 operand registers via selectors 500, 502. Each multiplier uses part of src1 and part of src2. The part used (upper/lower 16 bits) is independently selectable via op code. Each multiplier has a size input enabling selection of a single 16 by 16 bit multiply or a pair of 8 by 8 bit multiplies.

Shifters 510, 512 have fixed shift functions coded in the op code of certain instructions. These are selected from a limited set of shifts. Shifter 510 corresponding to mpy0 may select a 0 bit shift or a 16 bit left shift. Shifter 512 corresponding to mpy1 may select 0 bit shift, a 16 bit right shift, or a 32 bit right shift. The shift operation may generally be applied to the separate upper/lower 16 bit parts of the product of each multiplier. When a rounding 16×32-bit instruction is executed, shifter 510 is set to provide a 0 bit shift and shifter 512 is set to provide a 16-bit right shift to properly align the two partial products.

The output of these shifters is supplied to a 64 bit adder/subtractor 520. The output of shifter 510, being a least significant product, is generally supplied to the lower portion of the 64 bit adder/subtractor bits (47:0) depending upon the selected shift. Similarly, the output of shifter 512, being a most significant product, is generally supplied to the upper portion of the 64 bit adder bits (63:0) depending upon the selected shift. In the case of executing a rounding 16×32-bit instruction, the most significant partial product is supplied to a 32-bit mid portion of the adder input port in response to the selected shift values. Thus, a 47-bit combined product is formed by adder 520 during execution of a rounding 16×32-bit instruction.

Mid-point rounding signal MRND is connected to adder/subtractor 520 as an additional input to bit 14 and is asserted when a rounding 16×32-bit instruction is executed. This has the effect of adding a mid-position rounding value of 0x4000 to the combined product. This bit input is referred to as a "ram" bit such that the value of 0x4000 is "rammed" into the combined product. Thus, an intermediate result for a 16×32-bit instruction is formed at the output of adder 520 as a 47-bit sign extended integer value with mid-position rounding.

Shifter 540 provides shift value of 0, 15, and 16 bits. During execution of a rounding 16×32-bit instruction, shifter 540 is selected to provide a right shift of fifteen bits.

In another embodiment, a rounding signal is substituted for a carry-in bit.

Other System Examples

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 8:
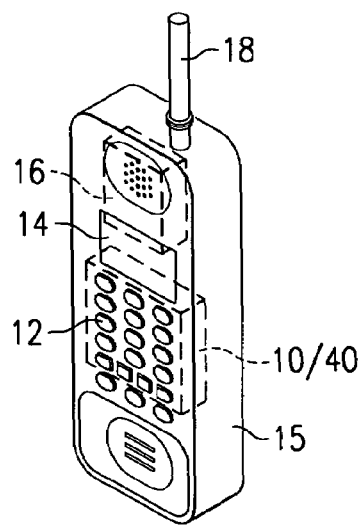
FIG. 8 illustrates an exemplary implementation of a digital system that includes an embodiment of the present invention in a mobile telecommunications device.

FIG. 8 illustrates an exemplary implementation of an example of an integrated circuit 40 that includes digital system 1 in a mobile telecommunications device, such as a wireless telephone with integrated keyboard 12 and display 14. As shown in FIG. 7, digital system 1 with processor 10 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by providing a set of rounding 16×32-bit instructions, complex signal processing algorithms, such as high precision FFTs, can be written in a more efficient manner to satisfy the demand for enhanced wireless telephony functionality.

Fabrication

Fabrication of digital system 1 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state tested for operational functionality. An integrated circuit that includes any of the above embodiments includes a plurality of contacts for surface mounting. However, the integrated circuit could include other configurations, for example a plurality of pins on a lower surface of the circuit for mounting in a zero insertion force socket, or indeed any other suitable configuration.

Digital system 1 contains hardware extensions for advanced debugging features. These assist in the development of an application system. Since these capabilities are part of the CPU core itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a functional unit in a digital system is provided with a set of rounding 16×32-bit instruction. Rounding is performed by adding a rounding value to form an intermediate result, and then shifting the intermediate result right. A combined result is rounded to a fixed length shorter than the combined product.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, more than two multiply circuits can be conjoined to provide even greater flexibility than a pair of multipliers, such that a matching number of pairs of input values are packed into the source operands. Other boundaries can be defined, such as a plurality of twelve bit multipliers, for example. A single M unit can be embodied in a digital system, or more the two M units can be embodied in a single digital system, for example.

Within an M unit, various combinations of fixed and/or variable shifters can be provided. Other mid-point rounding locations may be selected such that the rounding value is $2n$ and the intermediate result is shifted $n+1$. For example a rounding value of $211$ with a twelve bit right shift. Alternatively, instead of performing a right shift of $n+1$, a left shift can be performed to shift the final result to a more significant portion of a 64-bit output register, for example, to form a final result such that the n lsbs of the intermediate result stored in a destination register are truncated.

Other embodiments may report overflow as a status bit, for example, during product combination or rounding; software can then choose to ignore the overflow indications.

Another embodiment may treat both values of each pair of elements as signed numbers, or may treat both values of each pair of elements as unsigned numbers, for example.

In an embodiment of the invention, one instruction is provided which selects a high half word from two packed fields, and another instruction is provided that selects a low half word from two packed fields. In another embodiment, the number of fields may be different than two. In another embodiment, a control register or parameter selects the field.

In another embodiment, a prior final result is retrieved from a destination location and is combined with a current final result and the accumulated final result is stored at the destination location.

It is therefore contemplated that the appended claims will cover any such modifications of the embodiments as fall within the true scope and spirit of the invention.

What is claimed is:

1. A method of performing a product operation with rounding in a microprocessor in response to a single rounding multiplication instruction, the method comprising the steps of:
   fetching a first pair of elements and a second pair of elements;
   forming a most significant product of a first element of the first pair of elements and a most significant element of the second pair of elements and a least significant product of the first element of the first pair of elements and a least significant element of the second pair of elements, wherein the first element of the first pair of elements is a most significant element of the first pair of elements;
   combining the most significant product with the least significant product to form a combined product, wherein combining comprises shifting the most significant product left by a width of the least significant element of the second pair of elements prior to adding the most significant product to the least significant product;
   rounding the combined product to form an intermediate result; and
   shifting the intermediate result a selected amount to form a final result.

2. The method of claim 1, wherein the step of shifting truncates a selected number of least significant bits of the intermediate result.

3. The method of claim 2, wherein the step of rounding adds a rounding value to the combined product to form the intermediate result, and wherein the step of shifting shifts the intermediate result right by a selected shift amount.

4. The method of claim 3, wherein the rounding value is $2**n$ and the selected shift amount is $n+1$.

5. The method of claim 4, wherein n has a fixed value of fourteen.

6. A digital system having a microprocessor operable to execute a rounding multiplication instruction, wherein the microprocessor comprises:
   storage circuitry for holding pairs of elements;
   a multiply circuit connected to receive a number of the pairs of elements from the storage circuitry responsive to the multiplication instruction, the multiply circuit comprising a plurality of multipliers, wherein the plurality of multipliers form a most significant product of a first element of the first pair of elements and a most significant element of the second pair of elements and a least significant product of the first element of the first pair of elements and a least significant element of the second pair of elements, wherein the first element of the first pair of elements is a most significant element of the first pair of elements;
   an arithmetic circuit connected to receive the most significant product and the least significant product from the plurality of multipliers, wherein the arithmetic circuit shifts the most significant product by a number of bits prior to adding the most significant product to the least significant product, the arithmetic circuit having a provision for mid-position rounding responsive to the rounding multiplication instruction; and
   a shifter connected to receive an output of the arithmetic circuit, the shifter operable to shift a selected amount in response to the rounding multiplication instructions.

7. The digital system of claim 6, wherein the arithmetic circuit has a additional input connected to a mid-position, wherein the additional input is asserted in response to the rounding multiplication instruction.

8. The digital system according to claim 6 being a cellular telephone, further comprising:
   an integrated keyboard connected to the processor via a keyboard adapter;
   a display, connected to the processor via a display adapter;
   radio frequency (RF) circuitry connected to the processor; and
   an aerial connected to the RF circuitry.

9. A method of performing a product operation with rounding in a microprocessor in response to a single rounding multiplication instruction, the method comprising the steps of:
   fetching a first pair of elements and a second pair of elements;
   forming a most significant product of a first element of the first pair of elements and a most significant element of the second pair of elements and a least significant product of the first element of the first pair of elements and a least significant element of the second pair of elements, wherein the first element of the first pair of elements is a most significant element of the first pair of elements;

combining the most significant product with the least significant product to form a combined product;

rounding the combined product to form an intermediate result; and shifting the intermediate result a selected amount to form a final result.

10. The method of claim 9, wherein the step of shifting truncates a selected number of least significant bits of the intermediate result.

11. The method of claim 10, wherein the step of rounding adds a rounding value to the combined product to form the intermediate result, and wherein the step of shifting shifts the intermediate result right by a selected shift amount.

12. The method of claim 11, wherein the rounding value is 2**n and the selected shift amount is n+1.

13. The method of claim 12, wherein n has a fixed value of fourteen.

14. A digital system having a microprocessor operable to execute a rounding multiplication instruction, wherein the microprocessor comprises:

storage circuitry for holding pairs of elements;

a multiply circuit connected to receive a number of the pairs of elements from the storage circuitry responsive to the multiplication instruction, the multiply circuit comprising a plurality of multipliers, wherein the plurality of multipliers form a most significant product of a first element of the first pair of elements and a most significant element of the second pair of elements and a least significant product of the first element of the first pair of elements and a least significant element of the second pair of elements, wherein the first element of the first pair of elements is a most significant element of the first pair of elements;

an arithmetic circuit connected to receive the most significant product and the least significant product from the plurality of multipliers; and a shifter connected to receive an output of the arithmetic circuit.

15. The digital system of claim 14, wherein the arithmetic circuit has a provision for mid-position rounding responsive to the rounding multiplication instruction, wherein the arithmetic circuit has an additional input connected to a mid-position, wherein the additional input is asserted in response to the rounding multiplication instruction.

16. The digital system of claim 15, wherein the shifter is operable to shift a selected amount in response to the rounding multiplication instruction.

17. The digital system according to claim 14 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

* * * * *